(12) United States Patent
Halvorsen et al.

(10) Patent No.: US 6,879,546 B2
(45) Date of Patent: Apr. 12, 2005

(54) GEL-FILLED SEISMIC STREAMER CABLE

(75) Inventors: Åge Halvorsen, Homborsund (NO); Rolf Rustad, Rådal (NO); Eyvind Aker, Asker (NO)

(73) Assignee: Westerngeco, L.L.C., Houston, TX (US)

( * ) Notice: Subject to any disclaimer, the term of this patent is extended or adjusted under 35 U.S.C. 154(b) by 35 days.

(21) Appl. No.: 10/364,432

(22) Filed: Feb. 10, 2003

(65) Prior Publication Data

US 2004/0017731 A1 Jan. 29, 2004

Related U.S. Application Data

(60) Provisional application No. 60/356,696, filed on Feb. 14, 2002.

(51) Int. Cl.[7] .............................................. H04R 17/00
(52) U.S. Cl. ..................................................... 367/166
(58) Field of Search ................................ 367/166, 154, 367/130, 106, 16

(56) References Cited

U.S. PATENT DOCUMENTS

| | | | |
|---|---|---|---|
| 4,163,206 A | | 7/1979 | Hall, Jr. ...................... 367/160 |
| 5,745,436 A | * | 4/1998 | Bittleston .................... 367/154 |
| 6,477,111 B1 | * | 11/2002 | Lunde et al. ................ 367/154 |
| 6,570,821 B1 | * | 5/2003 | Moresco ...................... 367/154 |
| 2004/0017731 A1 | * | 1/2004 | Halvorsen et al. .......... 367/166 |

FOREIGN PATENT DOCUMENTS

| | | | | |
|---|---|---|---|---|
| FR | 2 800 880 | | 5/2001 | |
| GB | 2149916 | * | 6/1985 | ............ G01V/1/38 |

* cited by examiner

Primary Examiner—Daniel Pihulic
(74) Attorney, Agent, or Firm—Jeffrey E. Griffin

(57) ABSTRACT

A gel-filled seismic streamer containing a hydrophone housing which isolates a hydrophone element from shear waves and mechanical forces but sensitive to pressure waves. In one embodiment, the gel-filled streamers contains a hydrophone housing with an air pocket at each end for isolating a pressure sensitive hydrophone element from mechanical noise generated by cable movement during seismic data acquisition operations. The hydrophone housing further provides and a protective case to isolate a pressure-sensitive hydrophone element from shear waves. An inlet formed in the protective hydrophone housing enables pressure waves to be communicated to the pressure sensitive hydrophone element inside of the housing. An alternative hydrophone housing for deployment inside of a streamer is also disclosed which fixably positions a positioning hydrophone or seismic hydrophone within the housing using rubber supports.

24 Claims, 5 Drawing Sheets

GEL-FILLED SEISMIC STREAMER CABLE

CROSS REFERENCE TO RELATED APPLICATIONS

The following patent application is related to and claims priority from U.S. Provisional Patent Application Ser. No. 60/356,696 filed on Feb. 14, 2002 entitled Gel-Filled Seismic Streamer Cable.

BACKGROUND OF THE INVENTION

1. Field of the Invention

The present invention relates generally to the field of gel-filled streamer cables and in particular to placing a pressure-sensitive hydrophone inside of a gel-filled streamer section to isolate the hydrophone from shear waves and mechanical forces.

2. Summary of the Related Art

Marine seismic exploration and data acquisition is often conducted by a host vessel towing a seismic streamer at a given depth through the ocean or some other body of water. The seismic streamer is provided with a plurality of acoustic sensitive transducers disposed at appropriate intervals along its length. An acoustic source providing acoustic wave energy is provided in the vicinity of the seismic hydrophone cable or streamer, by an air gun or other suitable means. The acoustic wave energy travels downward through the earth with a portion of the acoustic energy being reflected upward at earth formation levels where there is a contrast in the velocity propagation characteristics of the strata.

The magnitude of the reflected signals is extremely small, thus making it essential to minimize extraneous noise. One source of such noise is the mechanical longitudinal waves, which are propagated along the strength member of a streamer. The unsteady movement of the seismic vessel towing the streamer as the vessel heaves, pitches and rolls in an unsteady ocean environment generates the mechanical longitudinal waves. This unsteady motion is transmitted to the streamer via its attachment to the vessel may also result in lateral, shear, Rayleigh and torsional waves depending on the structure of the cable. The seismic transducers detect these various undesirable waves, thereby reducing the signal to noise ratio of the desired pressure wave seismic signals reflected from subterranean formations. Therefore, it is an object of the present invention to provide a marine seismic cable in which the seismic transducers are isolated from shear waves and from mechanical waves generated in the cable by surface waves and the non-uniform movement of the seismic vessel towing the cable.

To perform seismic surveys over water-covered areas, such as offshore, or to obtain information regarding subterranean Earth formations for recovery of hydrocarbons (oil and gas), one or more streamers of hydrophones are towed behind a vessel designed for performing seismic surveys. For three-dimensional seismic surveys, several streamers (generally between 4 and 12) are deployed simultaneously, each such streamer extending usually between three (3) and eight (8) kilometers. Each streamer is normally formed by serially joining shorter streamer sections of 75 meters to 150 meters in length, referred to in the art as "active streamer sections." The streamer is generally deflected downward by a paravane and towed twelve to thirty feet below the water surface to reduce the effects of surface waves and surface reflected noise on the hydrophones. However, towing streamers at such depths requires greater pulling force, hence creating a need for larger and more powerful towing vessels, which in turn increases operating costs.

Typically, each active streamer section of commercially available streamer is made up of a flexible sealed tubular outer jacket manufactured from polyurethane or a similar material. Multiple strength members, generally between two and five in the form of cables made of steel or other high strength materials, such as those sold under the trade names of Kevlar or Vectran, are spaced apart radially around the longitudinal axis of the cable and run along the entire length of the active cable section. Typically, the strength members are deployed near the inside surface of the flexible tubular member to absorb the pulling forces when the streamer is towed behind the vessel. Hydrophones are typically placed in the center space between the radially spaced strength members. To detect very small reflections from the subterranean formations, groups of hydrophones equally spaced along the longitudinal axis of an active streamer section (typically in groups of between 8 and 14) are placed in each active streamer section. A one hundred (100) meter active streamer section typically provides between 96 and 150 hydrophones.

Typically, electronic circuitry, such as preamplifiers along with connecting wires, are placed between the active streamer sections to digitize analog hydrophone signals and provide two-way signal and data communication between the active streamer sections and control units located on the towing vessel. Since the streamer cables are to be towed at a predetermined depth below the water surface, the cable is deployed having predetermined buoyancy on deflected upward and downward to a desired depth by a paravane attached to the streamer cable. In liquid-filled cables, buoyancy is adjusted by filling all of the empty space inside the outer housing with a non-conductive buoyant fluid, such as kerosene.

Fluid-filled streamer cables suffer from a number of significant problems. The outer jacket is typically only a few millimeters thick and thus, is, easily penetrated by shark bites or other physical hazards encountered during towing, storage and deployment. Moreover, fluid-filled streamer cables are normally spooled onto large drums for storage on the vessels and often rupture during winding (spooling) and unwinding operations. Additionally, the outer jacket can be easily ruptured during towing when fishing boats inadvertently pass over the streamer and damage the streamer jacket on contact. Fish bites or streamer entanglement with offshore structures can also rupture the outer jacket. Seismic survey companies spend large amounts of money in repairing such cables and are typically forced to keep excessive inventory of such cables as spares for damaged cables. Outer jacket ruptures during surveying operations can require shut down of the surveying operations. Such down time can be very expensive due to the large capital cost of the vessels and the lost time of the crew, which can be several thousand dollars per hour.

The fluid in the fluid-filled streamer also creates a number of problems. As the fluid-filled streamer is towed, the tow vessel tugging on the streamer creates bulge waves within the fluid in each active stream section. Bulge waves are created within the streamer by low frequency excitation such as that caused by paravanes in rough seas. The bulge waves result from interactions between the internal mechanical members of the streamer, the fill fluid, and the pliant outer cable skin. Bulge waves tend to impart noise into the hydrophones, thereby degrading the quality of the detected signals. Additionally, the ripples at the water surface affect fluid-filled streamers. Each time a surface wave impinges upon the streamer cable, it creates an acoustic noise source, which transmits through the fluid in the form of noise.

Additionally, kerosene typically used in fluid filled streamers is toxic and highly flammable, which creates safety, health and environmental problems. Moreover, streamer filler fluid leaking into the ocean is hazardous to marine life.

As noted earlier, prior art streamer cables utilize between 96 and 150 hydrophones per 100-meter section. Groups of hydrophones are usually used to detect signals corresponding to a single point in the cable. Signals from all the hydrophones in each group are combined to reduce the effect of various types of noises present in the fluid-filled streamer cables. The cable design of the present invention is inherently less noisy and, thus, allows for the use of relatively fewer numbers of hydrophones per active cable section.

Fluid-filled streamer cables are but one of numerous designs and configurations known in the art. Gel-filled and solid streamers are also employed. Each type of streamer, however, entails its own characteristics, advantages and disadvantages. Solid streamers are durable and substantially immune to bulge wave noise, however, solid streamers can also be somewhat stiff and unwieldy during deployment and storage. Solid streamers also tend to couple longitudinal forces induced by cable motion and couple the associated mechanical noise into a solid-streamer hydrophone. Unlike solid streamers, fluid-filled streamers do not transfer as much mechanical noise and are more pliable during deployment. Fluid-filled streamers, however, are less durable than solid streamers and are susceptible to noise created by bulge waves as discussed above.

Moreover, as discussed above, fluid-filled streamers typically are thin-skinned and easily penetrated. The fluid in the streamers is typically toxic and flammable, which presents environmental and safety hazards when the fluid leaks from a breach in the skin. Thus, filler fluid leaking from a fluid-filled streamer into the ocean or on to the deck of a towing vessel is problematic. Fluid leaks allow water into the electronic streamer components. Thus, electronics can be jeopardized when water leaks into a fluid-filled streamer. Moreover, fluid-filled streamers typically lose buoyancy and sink when invaded by water.

Gel-filled streamers provide more flexibility than solid streamers and are more durable than fluid-filled streamers. Gel-filled streamers do not present the environmental concerns associated with spills from fluid-filled streamers. Gel-filled streamers do not leak or lose buoyancy when ruptured. The gel remains in place in the streamer and is not displaced by water should a leak occur in the streamer. Typical gel-filled streamer hydrophones designs, however, are sensitive to noise caused by cable motion and turbulent flow on the exterior streamer surface. Thus, there is a need to isolate these hydrophones from mechanical forces originating at the surface of the streamer and inside the streamer body.

SUMMARY OF THE INVENTION

The present invention addresses the problems and shortcomings of the prior art. The present invention provides a gel-filled streamer, which is an improvement over conventional oil-filled streamers, the present invention being less susceptible to physical damage from wear and tear as a result of normal operations and external factors such as shark bites and floating debris. The present invention provides improvements over known gel-filled streamers and solid streamers by providing a reduced-noise hydrophone housing which isolates the hydrophone element from shear waves and mechanical forces during deployment in a gel-filled streamer. The present invention provides a hydrophone, which enables increased productivity and quality of marine seismic surveys.

The present invention provides a novel hydrophone design, wherein a hydrophone is placed inside of long streamer section, which is part of a streamer array configuration. The preferred hydrophone streamer provides support ropes to resist tension along the longitudinal axis of the streamer and relieve tension on the power and data wires that connect the hydrophone to seismic data acquisition electronics. Cylindrical spacers are mounted inside of the streamer to maintain the streamer's cylindrical cross section while the streamer is reeled onto a spool to prevent electrical wires and hydrophones from being crushed. The spacers are generally evenly separated and prevent radial compression of the streamer. The spacers also help maintain its longitudinal spacing of hydrophones and wires. Hence, the spacers help to protect the wires by preventing tightening which may cause a streamer wire to snap when a streamer is wound onto a storage reel. The spacer also protects hydrophones and seismic hydrophones that are inside the streamer from being crushed by radial compression on a storage reel.

The preferred hydrophone is placed in a gel-filled streamer between a pair of spacers. The entire hydrophone apparatus, comprising a core, spacers, a housing and hydrophone element, is placed inside of a gel-filled streamer having an exterior lining or "skin." The external layer of the streamer has an inner diameter comparable to the outer diameter of the spacers. The remaining volume inside of the streamer skin is filled with either a gel of mass density lower than the density of water or a gel containing buoyant microballoons, air bubbles or buoyant micro-spheres that reduce the density of the gel such that the streamer section becomes neutrally buoyant or slightly buoyant in water. Higher density spheres can be added to the gel to reduce buoyancy.

The pressure-sensitive hydrophone element preferably comprises a piezoelectric element placed inside of a protective hydrophone housing. In one example of a preferred embodiment, the piezoelectric element is cylindrical, however, the piezoelectric element can be any desired shape. The protective housing is further encapsulated within a supporting case that shields the interior element from mechanical forces acting on the external surface of the supporting case. The supporting case is closed at each end by a disk at each of the end faces of the supporting case. A small void volume of air (air pocket) is formed between the protective housing and the disk at each end of the case. The end air pocket prevents longitudinal mechanical forces acting on the end faces of the case from being transferred to the hydrophone piezoelectric element. The protective hydrophone case is immersed in gel and fixably floats in the gel therein and stays in position at the center of the streamer. The volume inside of the piezoelectric hydrophone element is also filled with gel. In a preferred embodiment, the gel in the center of the piezoelectric element does not contain buoyancy air bubbles or buoyant micro spheres. A pressure aperture or inlet in the casing enables pressure waves incident on the cable exterior to be communicated to the hydrophone element. Thus, acoustic pressure waves incident upon the pressure inlet are transferred to the inside of the piezoelectric element through pressure inlets formed in the hydrophone protective case and hydrophone housing.

An air-filled cavity is also provided on the outside of the hydrophone element between the protective housing and the hydrophone element to enable radial expansion and contraction of the piezoelectric element when the fluid pressure incident on the piezoelectric element increases due to seismic waves impinging on the inside of the piezoelectric element.

Positioning hydrophones or transponders may also be provided in gel-filled streamer sections. The positioning hydrophones or positioning transponders are utilized to provide positioning data for the streamer. These positioning hydrophones/transponders may be located in auxiliary sections of the streamer known as "stretch" sections or vibration isolation modules The stretch sections are typically located in front of or after the active streamer sections.

In one aspect of the invention, a seismic hydrophone is presented comprising a pressure-sensitive hydrophone element; a housing surrounding the hydrophone element for mechanically isolating the hydrophone element from mechanical forces incident upon the external surface of the housing; and a pressure inlet formed in the hydrophone housing for communication to the hydrophone element, of external pressure waves incident upon the pressure inlet. In another aspect of the invention, the hydrophone housing is deployed in a streamer, wherein the hydrophone housing further comprises an air gap located at each end of the housing to isolate a hydrophone element from mechanical noise associated with streamer movement.

In another aspect of the invention the hydrophone housing further comprises an air gap surrounding an exterior surface of the element so that the element can expand radially outward into the air gap under the influence of seismic pressure waves. In another aspect of the invention the pressure sensitive hydrophone element further comprises a piezoelectric form having a hollow center filled with gel for communicating pressure waves to the piezoelectric form. In another aspect of the invention the remaining space in the streamer is also filled with gel. In another aspect of the invention the gel further comprises a buoyancy altering material added to the gel. In another aspect of the invention a protective casing is provided covering the hydrophone housing for isolating the hydrophone element from forces incident upon the outside of the casing. In another aspect of the invention a spacer is provided inside the streamer to maintain the circular streamer cross-section and to prevent the hydrophone element inside the streamer from being crushed when spooling the streamer.

In another aspect of the invention a method for providing a seismic hydrophone is provided comprising placing a pressure-sensitive hydrophone element inside of a streamer; surrounding the hydrophone element with a housing for mechanically isolating the hydrophone element from mechanical forces and shear waves incident upon the external surface of the housing; and forming a pressure inlet in the hydrophone housing for communication to the hydrophone element, of external pressure waves incident upon the pressure inlet. In another aspect of the invention a method is presented further comprising deploying the hydrophone housing in a streamer; and providing an air gap located at each end of the hydrophone housing to isolate the hydrophone element from mechanical noise associated with streamer movement.

In another aspect of the invention a method is presented further comprising forming an air gap surrounding an exterior surface of the hydrophone so that the hydrophone can expand and contract radially into the air gap under the influence of seismic pressure waves. In another aspect of the invention a method is presented further comprising forming a piezoelectric form having a hollow center filled with gel for communicating pressure waves to the hydrophone element. In another aspect of the invention a method is presented further comprising filling the remaining space in the streamer with gel. In another aspect of the invention a method is presented further comprising inserting a buoyancy altering material in the gel. In another aspect of the invention a method is presented further comprising deploying the hydrophone in a gel-filled streamer; placing a spacer inside the streamer to hold the hydrophone and associated wiring in place along the longitudinal axis of the streamer.

BRIEF DESCRIPTION OF THE DRAWINGS

Other objects and advantages of the invention will become apparent upon reading the following detailed description and upon reference to the accompanying drawings in which.

Figure 1:
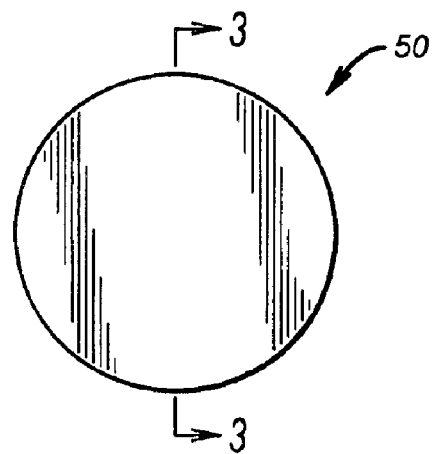
FIG. 1 is a front view of the preferred hydrophone housing shape, as viewed in a plane perpendicular to the longitudinal axis of the hydrophone.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF A PREFERRED EMBODIMENT

Figure 2:
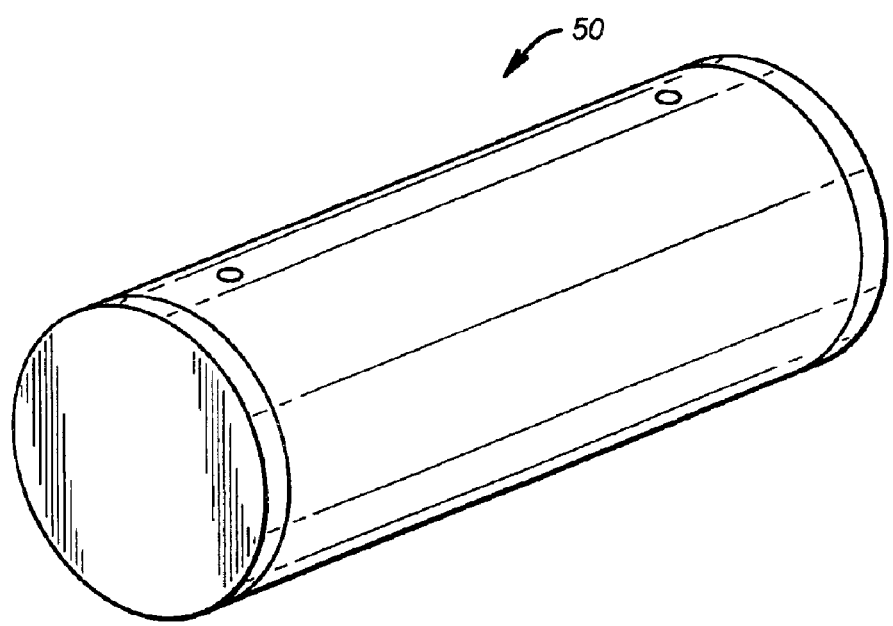
FIG. 2 is a three-dimensional illustration of the preferred hydrophone housing shape.
Figure 3:
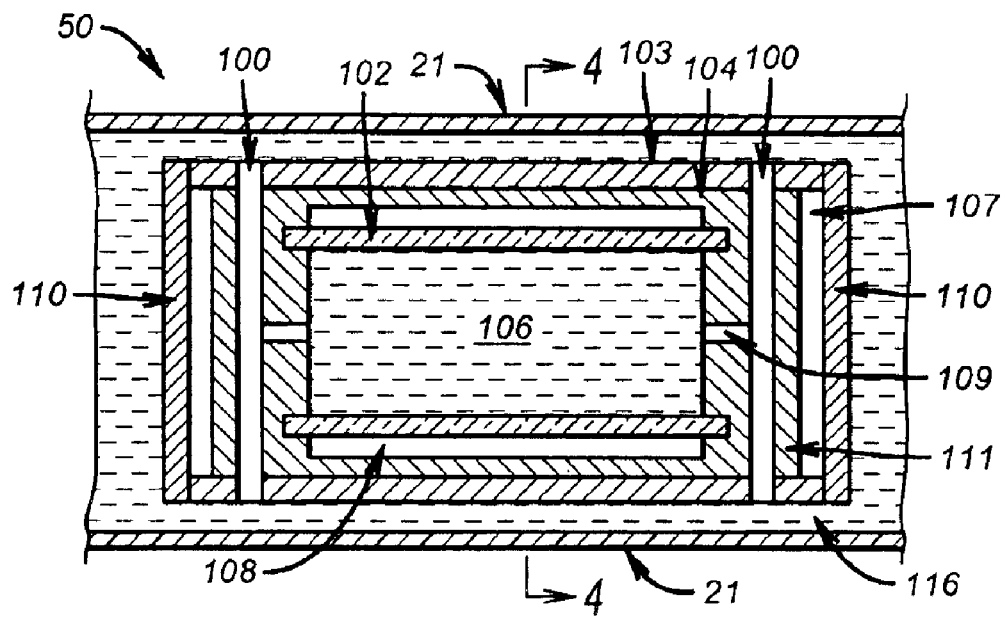
FIG. 3 is a cross-sectional view along the longitudinal axis of the preferred hydrophone housing illustrating the preferred pressure fluid inlet and air pockets.

Turning now to FIG. 1, a front view of the preferred hydrophone housing 50 is illustrated. As shown in FIG. 2, the preferred hydrophone housing 50 provides a circular cross-sectional area and a cylindrical shape in three-dimensions. Turning now to FIG. 3, a cross-sectional view of the preferred hydrophone streamer is shown illustrating the location of fluid pressure inlet 100, cylindrical piezoelectric hydrophone element 102, protective hydrophone casing 103 and hydrophone housing 104. Element 102 is placed inside of housing 104. Housing 104 is placed inside of protective hydrophone case 103.

Protective hydrophone casing 103 shields housing 104 from mechanical forces acting on the surface of the protective hydrophone casing 103. Housing 104 has faces 111 formed at each end of the housing 104. The protective hydrophone casing 103 is closed at each end with a disk 110 at each of its end faces. An air gap 107 is provided between each protective hydrophone casing end face disk 110 and each protective hydrophone casing end face 111. Air gap 107 isolates the piezoelectric element 102 from forces associated with cable movement and from acting on the hydrophone element 102. The interior cylindrical volume of ceramic piezoelectric element 102 is filled with gel 106.

As shown in FIG. 3, piezoelectric element 102 is filled with gel 106 and surrounded by air gap 108. Housing 103 surrounds air gap 108. Air gap 108 surrounds piezoelectric element 102 from forces incident upon outside of support case 103. In the present invention, only pressure waves incident upon inlet 100 which are of significant magnitude to be coupled through gel 106 via inlet passage 109 to piezoelectric element 102 are picked up by the preferred piezoelectric element 102. Thus, the noise associated with turbulent flow, cable movement and shear waves is reduced, and only the seismic pressure waves are coupled through inlet 100 to the piezoelectric element 102 via gel 106 via inlet passage 109. Thus, the present invention provides a piezoelectric or pressure sensitive element that is isolated from mechanical forces and shear waves while remaining sensitive to seismic pressure waves.

Inlet 100 enables communication of seismic pressure waves incident upon inlet 100 through inlet passage 109 to gel 106, which communicates the pressure signal to piezoelectric element 102. In a preferred embodiment, inlet 100 is filled with gel 106. This arrangement enables communication of acoustic energy external to the piezoelectric element 102 via fluid pressure inlet 100, also shown in FIG. 5. Inlet 100 also enables external pressure waves to be communicated from the surrounding water external to the streamer skin 21 to gel 116 to inlet 100 to the center of element 102. In a preferred embodiment, buoyant microspheres or air-filled spheres are mixed into the gel 116 inside of skin 21 and outside of hydrophone housing 50.

The preferred pressure sensitive element 102 comprises a ceramic piezoelectric cylinder as a pressure-sensitive element. Thus, piezoelectric element 102 is substantially isolated from the small pressure waves incident upon the exterior of the hydrophone casing 103. Other types of piezoelectric or pressure sensitive materials are also suitable for the pressure-sensitive hydrophone element. Air pocket 108 not only mechanically isolates the piezoelectric element 102 from the hydrophone housing, it also enables piezoelectric element 102 to expand and contract, or flex, radially under the influence of pressure signals transmitted to piezoelectric element 102 via gel 106.

Figure 4:
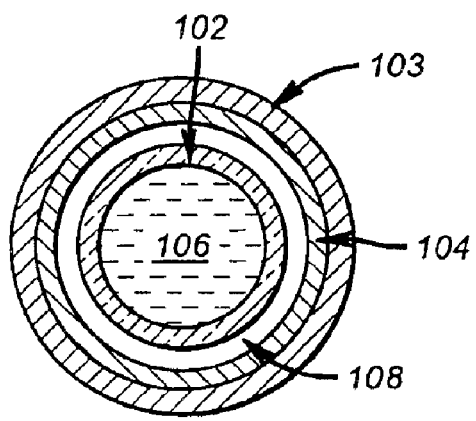
FIG. 4 is a cross-sectional view in a plane perpendicular to the longitudinal axis of the preferred hydrophone apparatus illustrating an isolating air pocket and gel-filled piezoelectric element.
Figure 5:
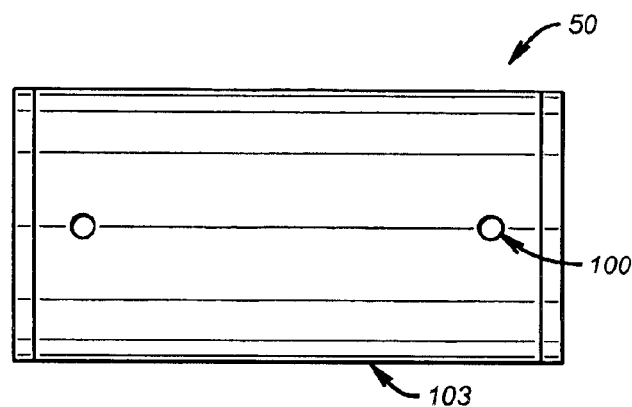
FIG. 5 is a top view of the preferred hydrophone housing.

Turning now to FIG. 4, a cross-section of the hydrophone of FIG. 3, is illustrated. As shown in FIG. 4, element 102 is filled with gel 106. Supporting case 103 surrounds housing 104. Housing 104 encapsulates and surrounds air gap 108. Air gap 108 surrounds element 102. Turning now to FIG. 5, a top view of the preferred hydrophone is illustrated showing pressure inlet 100. As shown in FIG. 5, pressure inlet 100 is formed supporting case 103 to enable communication of pressure waves to the element 102.

Figure 6:
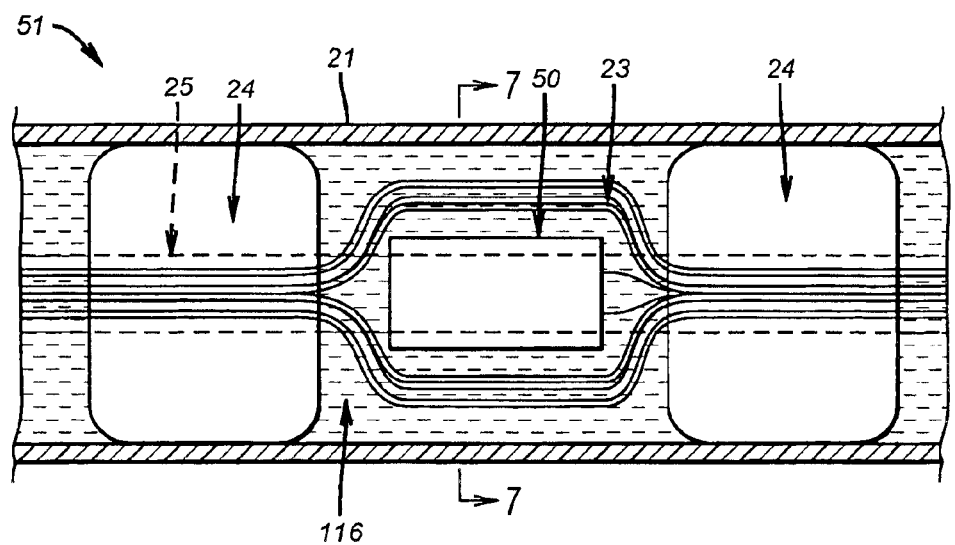
FIG. 6 is a cross-sectional view of the preferred hydrophone housing deployed in a gel-filled streamer illustrating hydrophone spacers.

Turning now to FIG. 6, a side view is presented showing the preferred hydrophone 50 immersed in gel 116 and positioned inside of streamer 51 exterior skin 21. Hydrophone 50 is surrounded by buoyancy-enhanced gel 116, which is in communication with the gel 106 inside of the element 102. As shown in FIG. 6, spacers 24 are placed inside of streamer skin 21 on each side of hydrophone 50. Spacers 24 maintain the circular streamer cross section and protect the hydrophone 50, data and power cables 23 which connect data acquisition electronics to the hydrophone 50 from being crushed when the streamer is spooled for storage. Strength members 25 are inserted through spacer 24 relieve strain along the longitudinal axis of the streamer 51.

In a preferred embodiment wherein a plurality of hydrophones 50 are deployed within a streamer section 51, a plurality of spacers 24 are deployed with each hydrophone in the streamer. Spacers may also be deployed elsewhere in a streamer section.

Figure 7:
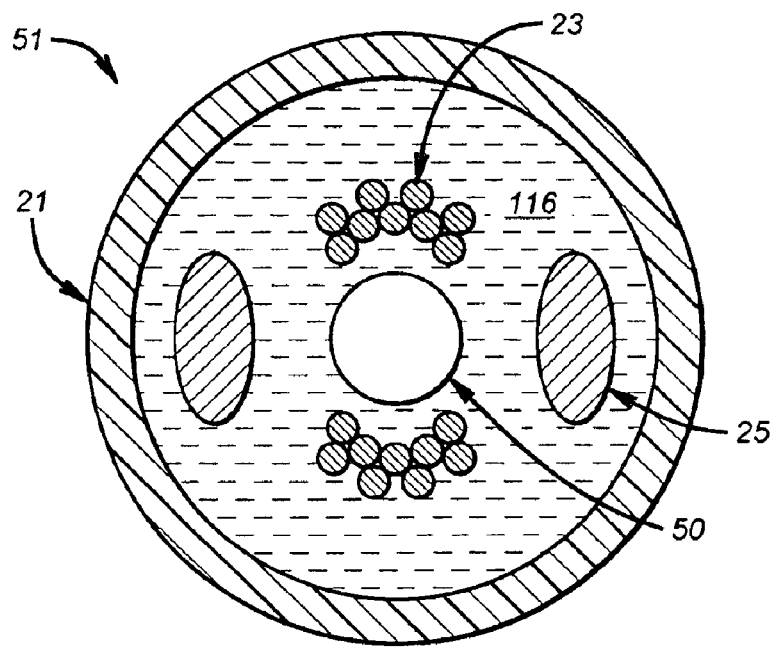
FIG. 7 is a cross-section illustrating the arrangement of the hydrophone within a gel-filled streamer.

Turning now to FIG. 7, a cross-section of the preferred hydrophone 50 deployed in the streamer 51 of FIG. 6 is illustrated. As shown in FIG. 7, streamer skin 21 surrounds buoyancy enhanced gel 116 in which the hydrophone 50 is suspended. Data and power cables 23 are shown along with strength members 25. Strength members 25 relieve the strain along the longitudinal axis of streamer 51 caused by towing the streamer. The interior of streamer skin 21 is otherwise filled with buoyant gel 116 as shown in the cross-section of FIG. 7. In a preferred embodiment hydrophone 50 is free floating in gel 116 and remains in position substantially along the longitudinal axis of the streamer. In another embodiment hydrophone 50 is held in place by mechanical means such as elastic bands.

Figure 8:
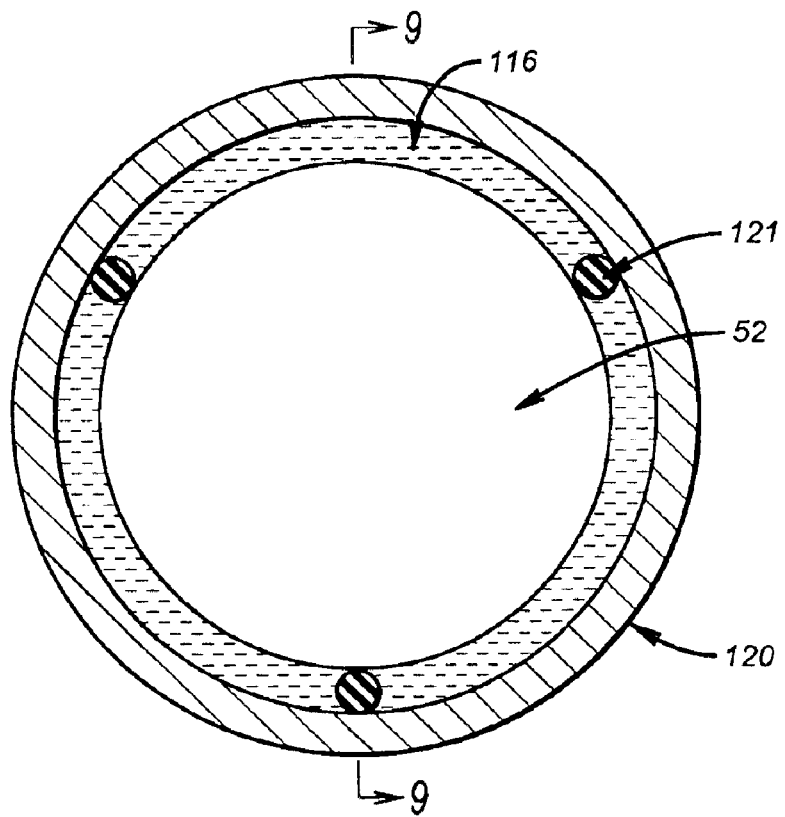
FIG. 8 is a front view of an alternative embodiment of the preferred hydrophone housing.
Figure 9:
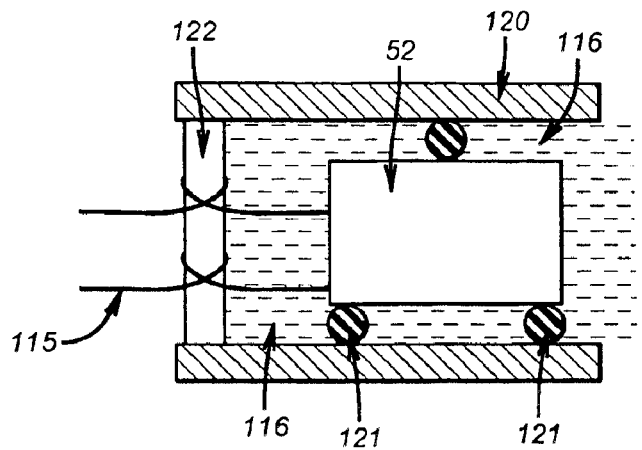
FIG. 9 is a cross-section of the alternative embodiment of FIG. 8.

Turning now to FIG. 8, a cross-section of an alternative embodiment housing 120 of hydrophone housing 104 is illustrated. As shown in FIG. 8, a positioning hydrophone 52 or seismic hydrophone is shown positioned inside of hydrophone housing 120. Positioning hydrophone 52 or seismic hydrophone is supported inside of hydrophone housing 120 by rubber supports 121. In an alternative embodiment, positioning hydrophone 52 or seismic hydrophone is held inside of housing 120 by rubber support 121 which engage the outer surface positioning hydrophone 52 or seismic hydrophone and the inner surface of hydrophone housing 120 to fixably position and hold positioning hydrophone 52 or seismic hydrophone inside of housing 120. Turning now to FIG. 9, a spacer 122 is provided to maintain the circular cross section of the streamer to prevent damage to the positioning hydrophone 52 or seismic hydrophone inside of the streamer. The spacer also maintains the longitudinal position of the positioning hydrophone 52 or seismic hydrophone and wires 115 to prevent tightening and breaking of wires 115 when the stream is coiled for storage. The interior of the streamer and the interior of the hydrophone housing 120 are filled with gel 116.

Figure 10:
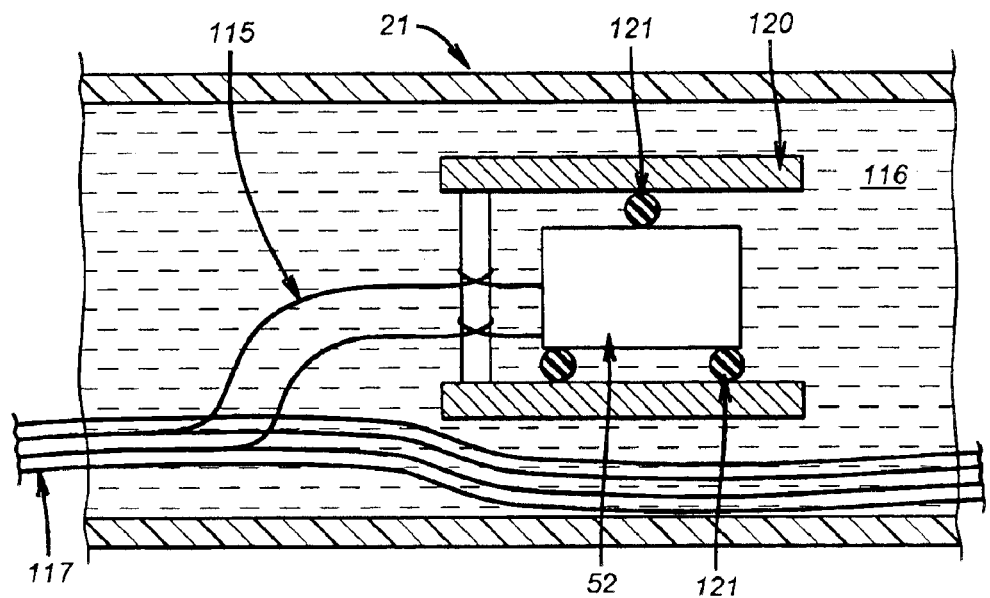
FIG. 10 is a cross-section of a gel-filled streamer section illustrating the alternative embodiment of FIG. 8 installed in a streamer section.

Turning now to FIG. 10, a three-dimensional illustration of the alternative hydrophone housing 120 is illustrated. As shown in FIG. 10, the hydrophone housing preferably has a circular cross-section along the longitudinal axis and a three-dimensional cylindrical shape. The housing 120, however, may be any shape, which fits inside of streamer 21 and enables positioning hydrophone 52 or seismic hydrophone to be fixably positioned inside the hydrophone housing 120 by rubber supports 121. FIG. 11 illustrates a cross-section of a gel-filled streamer section with a positioning hydrophone 50 or seismic hydrophone 52 installed in housing 120 inside of a streamer skin 21. Wires 115 for providing data and power to positioning hydrophone 52 are connected to pass through cable 117 for routing data and power to and from positioning hydrophone 52 or seismic hydrophone. As shown in FIG. 11, gel 116 fills the empty spaces inside of hydrophone housing 120 and the inside of streamer skin 21.

The foregoing examples are for illustrative purposes only and not intended to limit the scope of the invention, which is defined by the following claims.

What is claimed is:

1. A hydrophone housing comprising:
   a pressure-sensitive hydrophone element wherein the pressure sensitive hydrophone element further comprises a hollow center filled with gel for communicating pressure signals to the pressure-sensitive hydrophone element;
   a housing surrounding the pressure-sensitive hydrophone element for mechanically isolating the pressure-sensitive hydrophone element from mechanical forces incident upon the external surface of the housing; and
   a pressure inlet formed in the housing for communication to the hydrophone element, of pressure waves incident upon the pressure inlet.

2. The apparatus of claim 1 further comprising:
   a streamer for deploying the hydrophone housing inside a streamer.

3. The apparatus of claim 1 wherein the housing further comprises an air gap located as each end of the housing to isolate the pressure-sensitive hydrophone element from mechanical noise.

4. The apparatus of claim 3 wherein a space surrounding the housing inside of a streamer is filled with gel.

5. The apparatus of claim 4 wherein the gel further comprises a buoyancy altering material.

6. The apparatus of claim 1 further comprising a protective casing covering the housing for isolating the housing from forces incident upon the outside of the casing.

7. The apparatus of claim 2 further comprising:
   a spacer inside of the streamer to maintain the shape of the streamer during storage to protect the hydrophone and associated wiring from being crushed.

8. A seismic hydrophone streamer comprising:
   a gel-filled streamer for deploying a pressure-sensitive hydrophone;
   a gel-filled pressure-sensitive hydrophone element for deployment inside of the gel-filled streamer; and
   a housing surrounding the pressure-sensitive hydrophone element having an air gap surrounding the pressure-sensitive hydrophone element to isolate the pressure-sensitive hydrophone element from mechanical forces.

9. A hydrophone streamer comprising:
   a gel-filled hydrophone in a housing for deployment inside of the streamer, wherein the housing further comprises a gel-filled hollow interior; and
   a rubber support for fixing the hydrophone inside of the hollow interior of the housing.

10. The apparatus of claim 9 further comprising a spacer for holding the hydrophone and associated wiring in place along the longitudinal axis of the streamer.

11. The apparatus of claim 9 wherein the gel alters the buoyancy of the streamer.

12. A method for deploying a hydrophone:
   positioning a gel-filled pressure-sensitive hydrophone element inside of a gel-filled housing surrounding the pressure-sensitive hydrophone element for mechanically isolating the pressure-sensitive hydrophone element from mechanical forces incident upon the external surface of the housing; and
   forming a pressure inlet formed in the housing for communication of pressure waves incident upon the pressure inlet to the pressure-sensitive hydrophone element.

13. The method of claim 12 further comprising:
   deploying the housing inside of a gel-filled streamer, wherein the housing further comprises an air gap located at each end of the housing to isolate the pressure-sensitive hydrophone element from mechanical noise.

14. The method of claim 12 further comprising:
   surrounding an exterior surface of the pressure-sensitive hydrophone element with an air gap so that the pressure-sensitive hydrophone element can expend radially outward into the air gap under the influence of pressure waves.

15. The method of claim 14 further comprising:
   communicating pressure signals to the pressure-sensitive hydrophone element through the gel filling hollow center in the pressure sensitive hydrophone element.

16. The method of claim 13 further comprising:
   filling an inside of the streamer surrounding the housing with gel.

17. The method of claim 16 further comprising:
   altering a buoyancy of the streamer with the gel.

18. The method of claim 12 further comprising:
   covering the housing with a protective casing for isolating the housing from forces incident upon the outside of the protective casing.

19. The method of claim 13 further comprising:
   locating a spacer inside of the streamer to maintain the shape of the streamer during storage to protect the hydrophone and associated wiring from being crushed.

20. A method isolating a seismic hydrophone from mechanical noise comprising:
   deploying a gel-filled pressure-sensitive hydrophone inside of a gel-filled streamer; and
   surrounding the pressure-sensitive hydrophone element in a gel-filled housing having an air gap surrounding the pressure-sensitive hydrophone element to isolate the pressure-sensitive hydrophone element from mechanical noise.

21. A method for deploying a hydrophone comprising:
   housing a gel-filled hydrophone inside of a housing having a gel-filled hollow interior for deployment inside of a streamer; and
   fixably positioning the hydrophone inside of the hollow interior of the housing using a support contacting the outside surface of the hydrophone and the inside surface of the housing.

22. The method of claim 21 further comprising:
   filling the streamer with gel.

23. The method of claim 21 further comprising:
   positioning a spacer inside of the streamer for maintaining a cross-section of the streamer to prevent crushing of the hydrophone.

24. The method of claim 22 further comprising:
   altering the buoyancy of the streamer with the gel.

* * * * *